Aug. 11, 1931.     S. E. HITT     1,817,920
AEROFOIL FOR AEROSHIPS
Filed Feb. 11, 1929
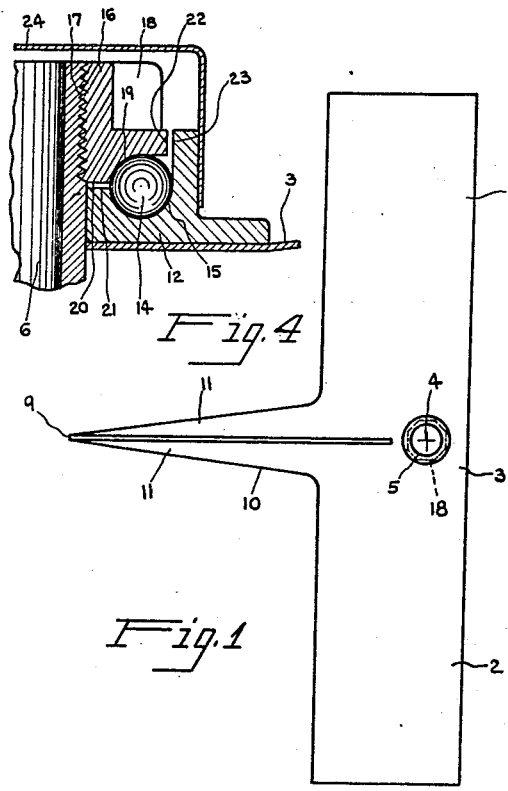
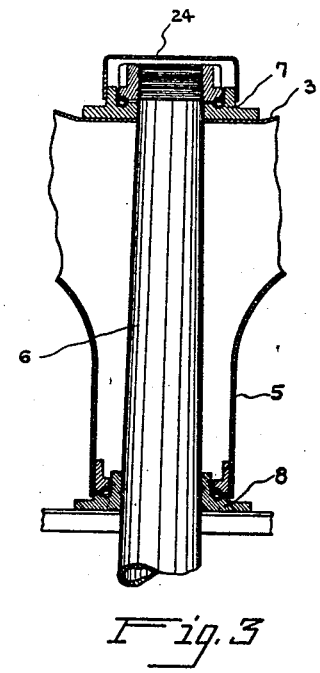
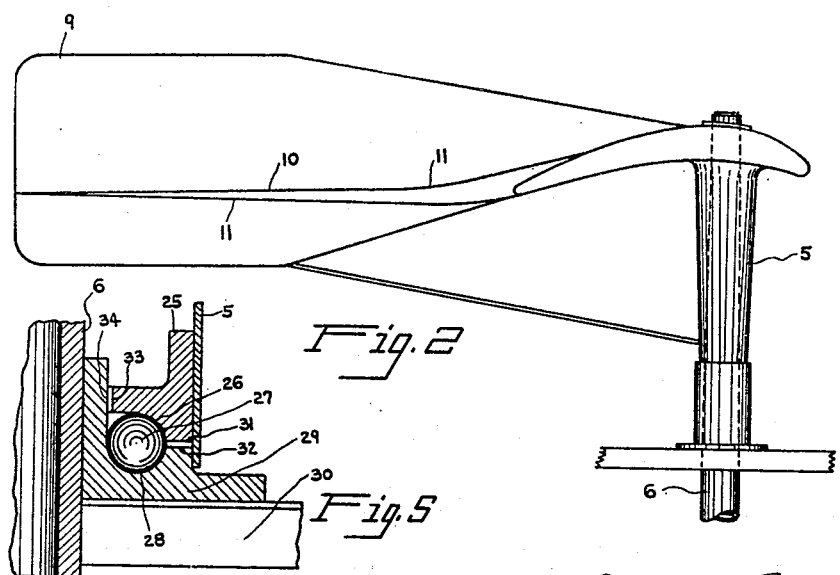
WITNESSES
Earle E. Weller
Ethel C. Weller
INVENTOR.
Samuel E. Hitt Patented Aug. 11, 1931

1,817,920

UNITED STATES PATENT OFFICE

SAMUEL E. HITT, OF ELYRIA, OHIO

AEROFOIL FOR AEROSHIPS

Application filed February 11, 1929. Serial No. 339,231.

This invention relates to improvements in aerofoils and has particular relation to use in the wings of an aero-hydro-glider, a seaplane intended to skip upon the crests of waves and rise only a few feet clear above the water, such as is shown and described in my application for air and water craft, filed March 26th, 1928, Serial No. 264,634.

An object of my invention is to provide a pair of wings with pivot mounting so that the wings will be free for automatic adjustment about a vertical axis, and so that their position relative to the supporting hulls and framework will depend upon the direction of air currents resulting from the direction and velocity of the prevailing wind and upon the direction and speed of the aeroship. In my invention, the cross currents of air upon the supporting surfaces of the wings are practically eliminated and maximum efficiency of the wings is thereby secured. In other words, the angle of yaw, as applied to the wing surface and the cross current of air is eliminated although the lift drift ratio is still the same as for a plane which is not pivoted. My invention maintains that ratio for any direction of the wind and therefore increases the general running efficiency of the plane.

Another object of my invention is to provide a tail unit for each pair of wings, to cause the wing unit to swing around until the wings head into the resultant air current.

Another object of my invention is to provide an upright mast mounting for the wing units.

Another object of my invention is to provide frictionless ball bearings in the said mountings so that the wings will readily respond to the changing direction of the air currents.

Another object of my invention is to provide frictionless ball bearings to carry the lifting load when the aeroship is under way.

Another object of my invention is to provide frictionless ball bearings constructed for side pressure.

Another object of my invention is to provide frictionless ball bearings to carry the weight of the wings when that weight is not carried by the lift.

Another object of my invention is to provide frictionless ball bearings so constructed that in case one of the ball bearings fails, no serious results will ensue and the bearing will continue to function with reduced efficiency.

With the above and other objects in view, the invention further includes the following novel features and details of construction, to be hereinafter more fully described, illustrated in the accompanying drawings and pointed out in the appended claims.

Referring to the drawings:—

Fig. 1 is a general plan of the aerofoil, showing a pair of wings, pivot mounting and tail unit.

Fig. 2 is a side view of the same.

Fig. 3 is a partial section through the pivotal mounting of the wings.

Fig. 4 is an enlarged section of the ball bearing for upward and side thrusts.

Fig. 5 is an enlarged section of the ball bearing for downward and side thrusts.

Referring to the drawings in detail wherein like characters of reference denote corresponding parts, at 1 is the left wing and 2 the right wing built together in rigid structure 3 and supported at the center of lift 4 by a sleeve 5 built into the wing structure 3 and mounted upon the mast 6 with frictionless bearing 7 at the top and with frictionless bearing 8 at the bottom.

The wings 1 and 2 carry a tail unit 9 supported by the fuselage 10 built into the wing structure 3 and the sleeve 5. The tail unit 9 acts as a rudder to swing the wings 1 and 2 about to head them into the resultant air current.

As the aeroship glides over the surface of the water on an even keel or rises only a few feet above the water, no horizontal stabilizer is required.

The fuselage 10 is covered with surfaces 11 for stream line purposes.

The top bearing 7 carries the lifting load, the thrust being upward. The lower race 12 is carried by the wing structure 3 and contains the balls 14 running in the groove 15. The upper race 16 is secured to the mast 6 at 17 and can be easily removed by unscrewing the head 18.

Upward and side thrusts transmit from race 12 through balls 14 to race 16. Should the balls 14 fail or the balls and race surfaces become badly worn, the joint 20—21 closes and takes the lift load and the joint 22—23 closes and takes the side load.

The cover 24 is dust and water proof and protects the top bearing 7 from the weather.

In the bottom bearing 8 the dead load or weight causes a downward reaction.

The sleeve 5 carries the upper race 25 with surface 26 bearing on balls 27 which run in groove 28 of the lower race 29 which is secured to the mast 6 and supported by the framework 30 of the aeroship.

Should the balls 27 fail or the balls 27 and grooves 26—28 become badly worn, the joint 31—32 closes and takes the weight load and the joint 33—34 closes and takes the side load. The operation of my invention is as follows:—

When the aeroship is at rest, standing by or in harbor, the rudder 9 causes the wing unit 1—2—3—5—9 to face into the prevailing wind, if any.

When the aeroship gets under way the air current acting upon the wing unit has a direction relative to the aeroship at an angle between that of the wind and the course of the aeroship, hereinafter called the resultant air current.

This resultant air current acting upon the rudder causes the wing unit to face that way or head into the resultant and resisting air current to the end that perfect stream lines ensue and maximum efficiency is attained.

As the aeroship gains speed, the wing unit heads more and more into the course of the aeroship.

For instance, if the wind is blowing from starboard, 45° off course, at 20 miles an hour, when the aeroship attains a speed of 60 miles an hour, the wing unit will head into the resultant air current from starboard 15° off course. When there is no wind and the aeroship gets under way, the air current acting upon the rudder 5 causes the wing unit to face straight ahead.

This is the ideal running condition and is closely approximated in my invention for all directions of the wind.

In case the aeroship starts out with the wind and a stiff breeze is blowing, it is possible that the wing units would be facing backward instead of forward, but no harm is done because the aeroship is propelled by fan motor units supported on the hull framework and independent of the wing units and when the aeroship attains a speed greater than that of the prevailing wind, the wing units right themselves and face toward the resultant air current.

It is apparent that the embodiment of the invention which I have described in detail possesses all the features of advantage enumerated as desirable in the statement of the invention and the above description. It is also evident that numerous changes in the details of construction and in the combination and arrangement of parts may be resorted to without departing from the spirit and scope of the invention as hereinafter claimed without sacrificing any of its advantages.

I claim:—

1. In an aeroship or similar craft, a wing unit pivoted upon a mast of the said craft, ball bearing mounting of the said unit upon the said mast and safety joints arranged to act as bearings in case the balls fail to function, substantially as specified.

2. In an aeroship or similar craft provided with a mast, and an aerofoil journaled upon the mast; the aerofoil comprising a generally horizontal wing member extending transversely of the mast, a tail extending transversely of the wing member in one direction from the wing member and in the general plane of that member, a rudder extending in the axial plane of the mast, and two mast-journaling means coaxial with the mast.

3. In an aeroship or similar craft provided with a mast, and an aerofoil journaled upon the mast; the aerofoil comprising a generally horizontal wing member extending transversely of the mast, a tail extending transversely of the wing member in one direction from the wing member and in the general plane of that member, a rudder extending in the axial plane of the mast, and two mast-journaling means coaxial with the mast, the said journaling means being respectively arranged for resisting upward and downward thrusts.

SAMUEL E. HITT.